United States Patent

Matovich

[15] 3,641,455
[45] Feb. 8, 1972

[54] METHOD AND MEANS FOR ACHIEVING CHEMICAL EQUILIBRIUM IN A SEALED-OFF CARBON DIOXIDE LASER

[72] Inventor: Edwin Matovich, Brea, Calif.
[73] Assignee: North American Rockwell Corporation
[22] Filed: July 13, 1970
[21] Appl. No.: 54,296

Related U.S. Application Data

[62] Division of Ser. No. 712,831, Mar. 13, 1968.

[52] U.S. Cl............................................331/94.5, 315/108
[51] Int. Cl.............................................................H01s 3/22
[58] Field of Search.....................331/94.5; 315/108; 313/1

[56] References Cited

UNITED STATES PATENTS 2,009,201   6/1935   Pirani et al..............................315/108
2,880,373   3/1959   Soloway.................................315/108
3,464,028   8/1969   Moeller.................................331/94.5

OTHER PUBLICATIONS

Carbone, IEEE J. Quanton Electronics, no. 1, Q E–3, No. 9 Sept., 1967, pp. 373–5.

Primary Examiner—Ronald L. Wibert
Assistant Examiner—R. J. Webster
Attorney—L. Lee Humphries, H. Frederick Hamann, Edward Dugas and Martin E. Gerry

[57] ABSTRACT

Chemical equilibrium and optimum operation in a sealed-off $CO_2$ gas laser is maintained by replenishing the $CO_2$ lost by dissociation into CO and $O_2$ either directly by providing a source and getter arrangement inside the laser tube or by replenishing the $O_2$ lost by reaction with oxygen gettering surfaces in the laser cavity by placing an oxygen yielding compound in the laser cavity which will react with the CO to product $CO_2$.

5 Claims, 6 Drawing Figures

INVENTOR.
EDWIN MATOVICH

BY Martin E. Gerry

AGENT

METHOD AND MEANS FOR ACHIEVING CHEMICAL EQUILIBRIUM IN A SEALED-OFF CARBON DIOXIDE LASER

DIVISION APPLICATION

This is a division of application, Ser. No. 712,831 filed Mar. 13, 1968, necessitated by Examiner's restriction.

BACKGROUND OF THE INVENTION

1. Field of the Invention

The present invention relates to $CO_2$ lasers and, more particularly, to a method and means for achieving chemical equilibrium in a sealed-off $CO_2$ gas laser.

2. Description of the Prior Art

Ever since the invention of the laser, many practical uses have been proposed therefor based upon its inherent property of producing a high intensity, highly collimated beam of light. For example, this property makes the laser extremely valuable in optical communication systems, in optical radar systems, in medicine, and, conceivably, as a weapon.

Lasers have been made using many different types of materials and compositions. One of the most useful and best lasers uses gaseous carbon dioxide ($CO_2$) mixed with helium (He) and nitrogen ($N_2$). Such lasers have many advantages. First of all, they are capable of producing a high-power light beam with a high efficiency. In addition, the light output is in the long wavelength infrared region which is ideally suited for optical communications and optical radar systems in the earth's atmosphere. Finally, $CO_2$ lasers have the highest degree of coherence of any known laser.

The efficiency and power of a $CO_2$ laser is a function of the composition of the gas. In order to keep the laser operating at peak power and peak efficiency, the composition must be kept constant. For this reason, a typical $CO_2$ gas laser is operated by causing a fresh supply of $CO_2$, He and $N_2$ to be continuously fed through the laser discharge tube. This requires a tank of $CO_2$, a tank of helium and a tank of nitrogen and suitable valves for mixing the three gases in the proper amounts. The mixture is then passed through the discharge tube and exits at the other end thereof. In a typical laser, a given volume of gas remains in the discharge tube for a time period of only a few seconds.

Although such a technique for constantly resupplying the discharge tube with a proper composition of gas is effective to provide an optimum laser, there are obvious problems associated with such a technique. For example, where it is desired to make the laser portable, lightweight or compact, it is evident that this cannot be accomplished in the presence of high-pressure tanks of gas, valves and regulators. Portable, lightweight and compact lasers are useful in aircraft environments and for field use. For this reason, it has been proposed to fill the laser discharge tube with the proper composition of carbon dioxide, helium and nitrogen and to seal off the tube. However, when this is done, it has been found that the laser will operate for only a short period of time, after which time it will stop lasing. Although, heretofore, this situation has continued to exist, no information presently exists which discloses the nature of the fundamental chemical problem nor proposes, even inadvertently, a solution thereto.

SUMMARY OF THE INVENTION

According to the present invention, the problem of providing a sealed-off $CO_2$ gas laser which will operate for thousands of hours or more has been solved by a discovery of the nature of the fundamental chemical problem, together with several solutions therefor. In the first instance, it has been discovered that the cause of the problem is that the carbon dioxide decomposes reversibly to form carbon monoxide and oxygen according to the formula:

$$CO_2 \rightleftarrows CO + \tfrac{1}{2}O_2$$

This reaction in itself is not the entire cause of the problem because, in the absence of any other effect, the carbon dioxide, carbon monoxide and oxygen would reach a state of equilibrium and the laser would continue to operate. However, it has been discovered that an additional effect occurs. Substantially all $CO_2$ lasers have oxygen gettering surfaces which either chemically react with oxygen or absorb oxygen such that a state of equilibrium is never reached. For example, typical laser electrodes are made of aluminum (Al), tungsten (W), tantalum (Ta), iron (Fe), etc., which react with the oxygen to form $Al_2O_2$, $WO_3$, $Ta_2O_5$, $Fe_2O_3$, etc. Therefore, since the oxygen is continually absorbed, the carbon dioxide continues to decompose to form carbon monoxide and oxygen until an insufficient amount of carbon dioxide is left for the laser to lase.

According to the present invention, this problem is solved by determining the oxidation rate and replenishing the oxygen so that the carbon dioxide to carbon monoxide and oxygen reaction can reach a point of stable equilibrium. In a first embodiment of the invention, this is accomplished by placing in the laser cavity any one of several oxygen yielding compounds which react with the carbon monoxide to product carbon dioxide, therefore continually replenishing that lost by dissociation. In another embodiment, the problem is solved by creating a solid-state source and getter arrangement inside the laser tube to provide a continuous source of $CO_2$, together with CO and $O_2$ getters to continually provide a fresh flow of $CO_2$ through the discharge tube. In still another embodiment of the present invention, the problem is solved by monitoring the pressure in the laser tube, a change in pressure indicating a change in the gas composition, and metering fresh gas into the laser to keep the pressure constant.

OBJECTS

It is, therefore, an object of the present invention to provide a novel sealed-off $CO_2$ gas laser.

It is a further object of the present invention to provide a method and means for maintaining chemical equilibrium in a $CO_2$ laser.

It is a still further object of the present invention to provide a sealed-off $CO_2$ gas laser which may be operated for many thousands of hours.

It is another object of the present invention to provide a sealed-off $CO_2$ gas laser in which the $CO_2$ is constantly replenished by placing an oxygen yielding compound in the laser cavity.

It is still another object of the present invention to provide a sealed-off $CO_2$ gas laser in which the $CO_2$ is constantly replenished by providing a solid-state source and getter arrangement inside the laser tube.

Another object of the present invention is the provision of a sealed-off $CO_2$ gas laser in which the $CO_2$ is constantly replenished by metering $CO_2$ into the laser tube as a function of the pressure therein.

Still other objects, features and attendant advantages of the present invention will become apparent to those skilled in the art from a reading of the following detailed description of the preferred embodiments constructed in accordance therewith taken in conjunction with the accompanying drawings wherein:

DESCRIPTION OF THE PREFERRED EMBODIMENTS

Figure 1:
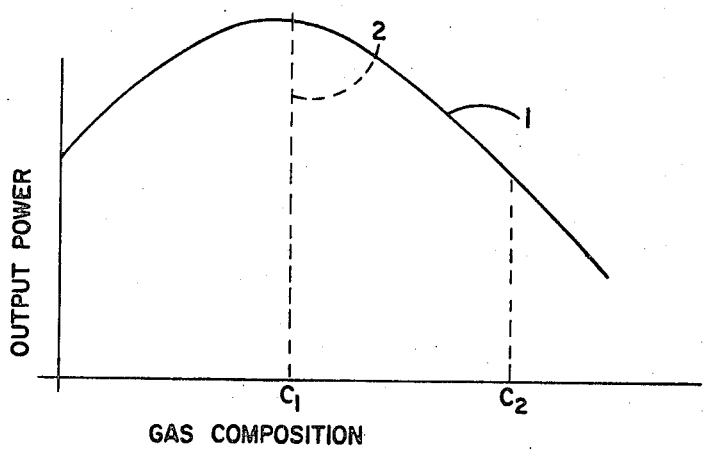
FIG. 1 is a graph showing the output power of a $CO_2$ laser as a function of the gas composition.

Referring now to the drawings and, more particularly, to FIG. 1 thereof, there is shown a curve 1 which represents the output power of a $CO_2$ gas laser as a function of the gas composition, the primary constituents of which are carbon dioxide, helium and nitrogen. It can be seen that there exists a single point 2 where the laser has a maximum output power. In order to maintain the gas composition at this level, the practice has generally been to provide a continuous flow of gas through the laser tube so that the composition of the gas remains constant. However, if the gas flow is stopped, the lifetime of the laser is generally considerably less than 100 hours.

According to the present invention, it has been determined that the predominant reason for the decreasing efficiency of sealed-off $CO_2$ lasers is the loss of $CO_2$ through dissociation to form CO and $O_2$ through the reaction:

$$CO_2 \rightleftharpoons CO + O_2.$$

Figure 2:
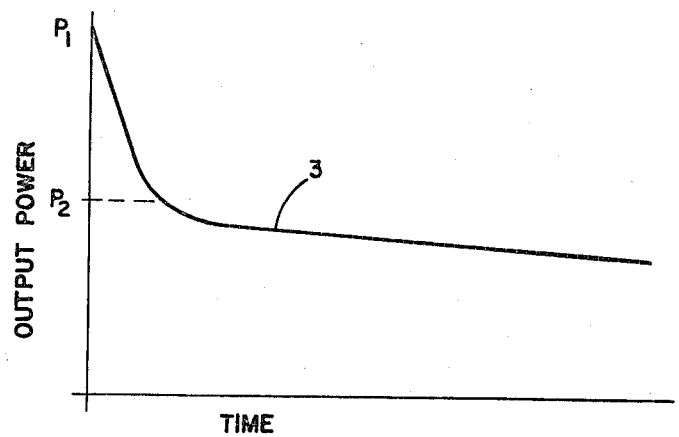
FIG. 2 is a graph showing the output power of a prior art sealed-off $CO_2$ laser as a function of time.

With reference to FIG. 2, as a result of this dissociation, when the laser is sealed off, the output power 3 drops immediately from a value $P_1$ to a value $P_2$. This is caused by the gas composition changing from a value $C_1$ to a value $C_2$ (see FIG. 1). However, it should be apparent that if this were the only effect, it could be easily compensated for by initially adjusting the gas composition so that upon sealing, the output power increases to the maximum point upon reaching equilibrium. However, this is not the case. The oxygen formed as a product of the dissociation of carbon dioxide will combine with any oxidizable material in the laser tube, such as the electrodes. For example, typical electrode materials are aluminum (Al), tungsten (W), tantalum (Ta) and iron (Fe). These metals, or any other which form a stable oxide, will react with the oxygen to form $Al_2O_3$, $WO_3$, $Ta_2O_5$, $Fe_2O_3$, etc. Since the oxygen is constantly being combined with the oxidizable material in the tube, the dissociation of $CO_2$ continues until there is not sufficient $CO_2$ left for the laser to continue to operate.

Realizing the source of the problem, many solutions immediately suggest themselves. For example, it has been suggested to solve the problem by using completely inert electrodes, such as platinum electrodes, which will not combine with the oxygen. However, although this has been found to slow the rate with which the $CO_2$ dissociates, it doesn't completely solve the problem because the presence of certain "inert" electrodes affects the discharge condition in the laser tube and creates additional problems, such as causing a catalytic decomposition of carbon monoxide (CO) into carbon and oxygen, whereupon the carbon precipitates out onto the electrodes. Also, it must be realized that there are oxygen getters in the $CO_2$ laser system other than the electrodes. Examples are porous glass or quartz surfaces, ion-bombarded surfaces, etc., which are necessarily present in the practice of the $CO_2$ laser art.

An additional solution which immediately suggests itself is to force the chemical reaction in the reverse direction by putting a heated wire in the laser tube. However, although, as before, this may be effective to slow down the rate of dissociation, it does not substantially solve the problem since the oxygen continues to combine with the electrodes and this oxygen cannot be replaced.

Finally, various other techniques have been suggested to minimize the rate of consumption of the reaction products by using various configurations of laser tubes and materials for the electrodes. However, in all cases, it has not been possible to significantly increase the life of a sealed-off laser.

Figure 3:
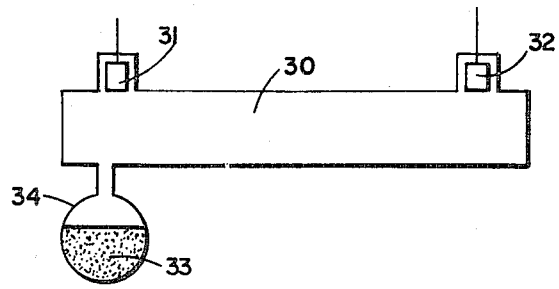
FIG. 3 is a schematic diagram of a first embodiment of the present invention.

Referring now to FIG. 3, according to a first embodiment of the present invention, it has been determined that the life of a sealed-off $CO_2$ gas laser 30, having conventional electrodes 31 and 32, may be substantially increased by introducing into laser tube 30 a material 33 which will react with the carbon monoxide to convert it back to $CO_2$. In other words, by placing an oxygen yielding compound into a container 34 connected to laser tube 30, i.e., a compound which will readily release its oxygen atom, an excess of oxygen can be provided in tube 30 which will react with the CO to form $CO_2$, thereby constantly replenishing the $CO_2$ at the rate it is used up. Several materials, such as $Ag_2O$, $MnO_2$, $KClO_3$, $Na_2O_2$, $Cu_2O$, and $Hg_2O$ have been found to operate successfully. For example, it has been found that if a small amount of silver oxide ($Ag_2O$) is placed in the laser tube at room temperature, the following reaction takes place:

$$Ag_2O + CO \rightarrow 2Ag + CO_2.$$

Similar net reactions take place between the carbon monoxide and the other oxygen yielding compounds mentioned, although reduction of the oxygen-yielding compound to a free metal is not a prerequisite.

Figure 4:
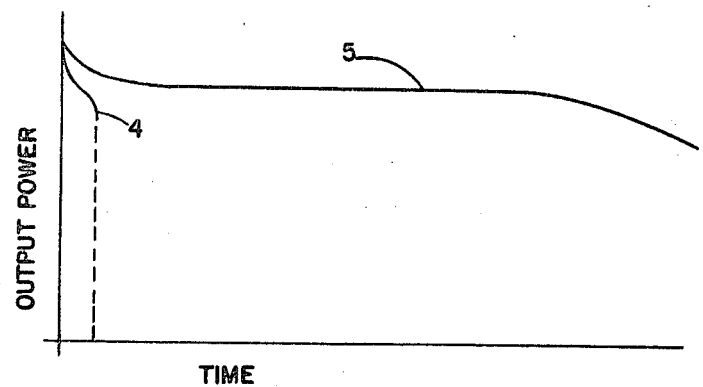
FIG. 4 is a graph showing the output power of a $CO_2$ laser constructed in accordance with the teachings of the present invention as compared to a prior art $CO_2$ laser as functions of time.

Thus, by including silver oxide or any other oxygen yielding compound with loosely bonded oxygen atoms in a sealed-off $CO_2$ laser, the gases will come to an equilibrium and run at this equilibrium concentration until all the $Ag_2O$ is used up or until some other, slower, reaction poisons the system in some other way. In this manner, the lifetime of the laser may be significantly increased, as shown in FIG. 4 where curve 4 is for a prior art sealed-off $CO_2$ laser and curve 5 is for a $CO_2$ laser which includes, in the laser tube, an oxygen-yielding compound.

Figure 5:
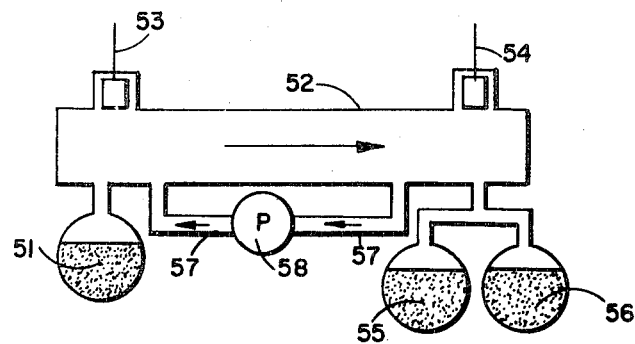
FIG. 5 is a schematic diagram of a second embodiment of the present invention.

Referring now to FIG. 5, there is shown a second embodiment of the present invention which solves the problem of the dissociation of carbon dioxide by providing a solid-state source and getter arrangement inside the laser tube to thereby create a source of $CO_2$ together with getters for CO and $O_2$ to provide an artificial continuous pumping system. In other words, by providing a container 51 containing a source of carbon dioxide in such a manner that the $CO_2$ so generated can flow into a laser tube 52 having conventional electrodes 53 and 54, a continuous source of $CO_2$ may be provided. Two additional reservoirs 55 and 56, containing a CO getter and an $O_2$ getter, respectively, also cooperate with laser tube 52. A recirculating loop 57, together with a pump 58, may be provided to circulate the gas through laser tube 52. Typical sources of $CO_2$ are $PbCO_3$, $Ag_2CO_3$, $BaCO_3$, $Cu_2CO_3$, $CaCO_3$, and $FeCO_3$. Each of these materials except $Ag_2CO_3$ may be temperature controlled to provide a continuous source of $CO_2$ to replenish the supply in tube 52. $Ag_2CO_3$ may be controlled photochemically. Examples of CO getters are $Cu_2Cl_2$, $K_4Fe(Cn)_6Fe$(Porphyrin) and Iron Phthalocyanine. Typical $O_2$ getters are aluminum, tantalum, tungsten, iron, chromium, magnesium, etc. By using this technique and continually circulating the gas in tube 52, a continuous supply of $CO_2$ may be provided. In addition, the CO and $O_2$ produced by the dissociation of $CO_2$ will be absorbed by the CO and $O_2$ getters.

Figure 6:
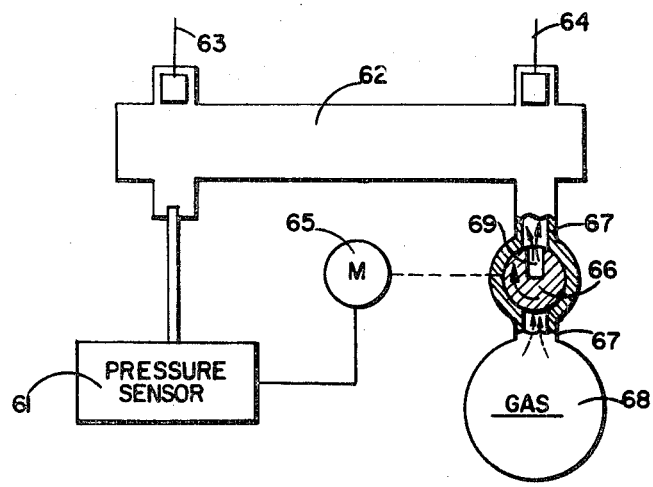
FIG. 6 is a schematic diagram of a third embodiment of the present invention.

Referring now to FIG. 6, there is shown a third embodiment of the present invention which solves the problem of the dissociation of carbon dioxide by providing a self-contained source of $CO_2$. The embodiment of FIG. 6 operates on the principle that the pressure in the laser cavity is a function of the gas composition and follows a curve similar to that of FIG. 1. Accordingly, a pressure sensor 61 is provided to sense the pressure within a laser tube 62 having conventional electrodes 63 and 64. The output of pressure sensor 61 is applied to a motor 65 which is actuated whenever the pressure in laser tube 62 changes. Motor 65 is operative to drive a valve 66 positioned in a passageway 67 between a container 68 and laser tube 62. Container 68 is filled with gaseous $CO_2$ and may also be filled with a small percentage of nitrogen and helium so that the ratio of the individual gases in container 68 is equal to the ratio of the rates at which these gases are removed by absorption, reaction, etc. Valve 66 has a U-shaped recess 69 therein so that upon one complete rotation, it is first filled up with a quantity of gas as the opening of recess 69 passes container 68 and then deposits the gas into laser tube 62 to restore the pressure therein. Since the pressure within laser tube 62 is typically on the order of one fiftieth of an atmosphere and the pressure within container 68 may be arranged to be on the order of one atmosphere, a substantial amount of gas may be stored in container 68 to keep laser 62 operating for a relative- While the invention has been described with respect to several physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

I claim:
1. In combination:
a sealed-off gas laser comprising carbon dioxide gas in a discharge tube and including self-contained means integral with said laser, said self-contained means comprising a solid-state source for continually replenishing the carbon dioxide gas in the discharge tube, said self-contained means includes a compound selected from the group consisting of $PbCO_3$, $Ag_2O_3$, $BaCO_3$, $CuCO_3$, $CaCO_3$, and $FeCO_3$;
a carbon monoxide getter; and
an oxygen getter, said carbon monoxide and oxygen getters being responsive to laser action for respectively absorbing the carbon monoxide and oxygen in said laser.

2. In combination:
a sealed-off carbon dioxide gas laser containing carbon dioxide gas in a discharge tube, the carbon dioxide decomposing to form carbon monoxide and oxygen;
self-contained means as an integral portion of said laser comprising a solid-state source of carbon dioxide for continually replenishing the carbon dioxide lost by dissociation;
a carbon monoxide getter; and
an oxygen getter, said getters being in communication with the discharge tube for absorbing said carbon monoxide and oxygen lost by the dissociation.

3. The combination as stated in claim 2, wherein:
said self-contained means is a solid-state compound selected from the group consisting of $PbCO_3$, $Ag_2CO_3$, $BaCO_3$, $CuCO_3$, $CaCO_3$ and $FeCO_3$.

4. The combination as stated in claim 2, including:
means for sensing the pressure in said discharge tube;
a passageway connecting said source and said discharge tube; and
valve means positioned in said passageway and responsive to the pressure sensing means for controlling the flow of $CO_2$ from said source.

5. The combination as stated in claim 4, wherein:
the valve means is operative to meter in predetermined amount of $CO_2$ from said source into said discharge tube upon a change of pressure of the gas in said discharge tube.

* * * * *